B. W. DECATUR.
CENTERING DEVICE.
APPLICATION FILED JUNE 29, 1918.

1,404,096.

Patented Jan. 17, 1922.

WITNESS:
Le Roy Kauffman.

INVENTOR,
Burt W. Decatur,
BY
Victor J. Evans
ATTORNEY.

UNITED STATES PATENT OFFICE.

BURT W. DECATUR, OF SPRINGFIELD, MASSACHUSETTS.

CENTERING DEVICE.

1,404,096.　　　　　Specification of Letters Patent.　　Patented Jan. 17, 1922.

Application filed June 29, 1918.　Serial No. 242,586.

*To all whom it may concern:*

Be it known that I, BURT W. DECATUR, citizen of the United States, residing at Springfield, in the State of Massachusetts, have invented new and useful Improvements in Centering Devices, of which the following is a specification.

The principal object of the invention is to provide means for ascertaining the correct position for mounting a chair for a spring on a vehicle axle in order to obtain correct alinement with reference to the spindles mounting the front wheels.

With the foregoing and other objects in view, the invention consists in the novel construction combination and arrangement of elements hereinafter described and claimed.

Figure 1:
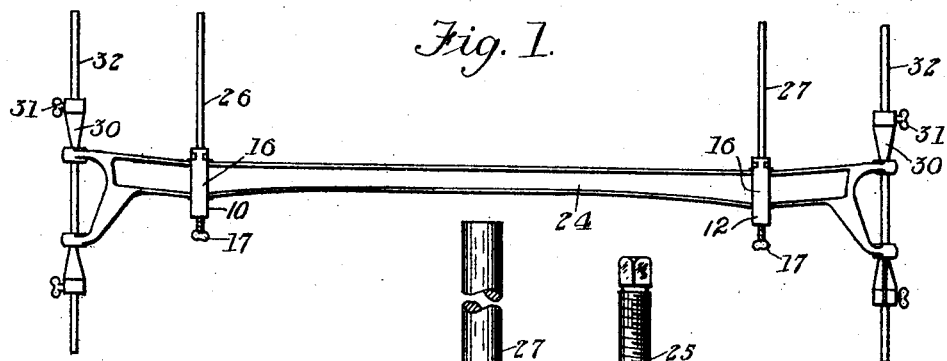
Figure 1 is a view in elevation showing the manner of utilizing the device.
Figure 2:
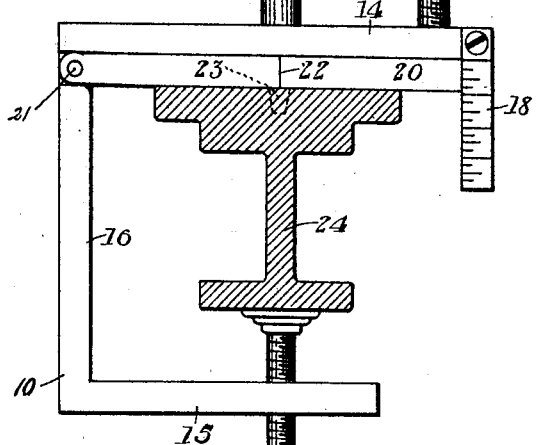
Figure 2 is an elevation from another angle and showing the axle in transverse section.
Figure 3:
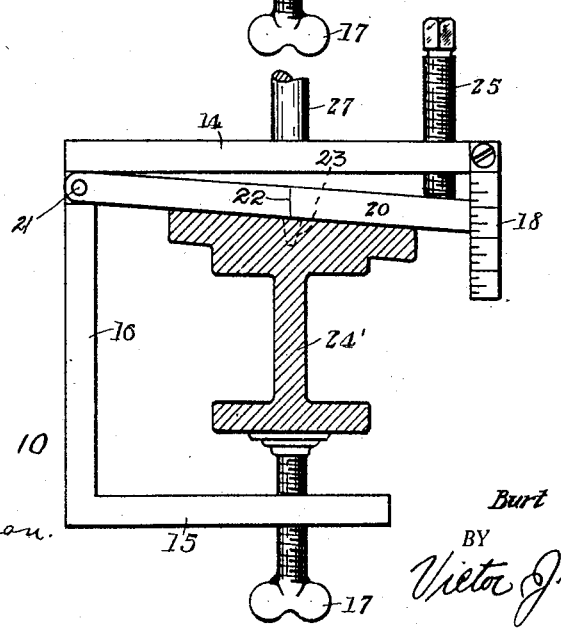
Figure 3 is a similar view showing a pivoted plate member co-operating with a scale and designed for use in connection with an axle having an inclined upper surface.

In carrying out my invention I employ a plurality of clamps, designated 10 and 12, these clamps including upper portions 14, lower portions 15 and connecting portions 16.

The portion 15 is threaded for the accommodation of the usual screw having a thumb member 17 on the end thereof.

Extending downwardly from the outer end of member 14 is a scale 18 with which a pivoted arm or plate (20) co-operates. This plate is mounted on member 16 by means of a pin 21 and carries an index mark 22 showing the centre of the bolt hole.

Element 20 also carries a pin on the lower side thereof, designated "23" and adapted to enter the hole provided for the bolt for securing the chair for the spring to the axle 24.

A screw "25" is threaded through element "14" and contacts with the element "20" for the purpose of adjusting the latter with reference to the scale in the operation indicated below.

Each clamp carries an upwardly extending sighting rod or pin; these elements being designated "26" and "27".

The apertures for the spindles mounted vertically at the end of the axle receive tapered members "30", each carrying a thumb screw "31" and a rod or pin "32".

These pins "32" are centered with reference to the apertures for the spindles, and the pins "26" and "27" are brought into alinement with pins "32" in order to determine the exact position to be occupied by the chairs and springs.

After the two pins 32 and the pins 26, 27 have been brought into alinement, the correct angle of inclination for the spring mounting means will be shown by the graduations on the scale 18. It is then only necessary to provide such inclination (as by the use of plates having a surface slightly inclined), when securing the springs in position.

The springs should be so mounted on the axle that the downward thrust due to the movement of the body is in a direction parallel with the vertical axes of the spindles which mount the knuckles and wheels. The center line through the bearings for each spindle determines the vertical axis of the spindle (when mounted), and the vertical axis of the springs would be in the same plane. In order to secure the result stated it is clearly necessary to bring the elements 32 and elements 26 and 27 into alinement, in a direction longitudinally of the axle. Then the inclination to be given to the chairs (determining the vertical axis of the springs), can be ascertained from the graduations on the scale.

What is claimed is:

1. The combination of a plurality of centering devices to be received by the apertures for the vertical spindles of an axle, pins carried by said centering devices, a clamp carried by the axle, and a sighting rod carried by said clamp.

2. The combination of a plurality of centering devices to be received by the apertures for the vertical spindles of an axle, a pin carried by each of said centering devices and in line with the vertical axis of the apertures, a clamp to be mounted on the axle, an arm pivoted to one element of the clamp, a scale member connected with the clamp at a point opposite the pivotal connection, said arm co-operating with the scale, and a pin projecting from the upper portion of the clamp, to be brought into line with the pins first named.

3. The combination of a plurality of centering devices to be received by the apertures for the vertical spindles of an axle, a pin carried by each of said centering devices and in line with the vertical axis of the apertures, a clamp to be mounted on the axle, an arm pivoted to one element of the clamp, a scale member connected with the clamp at a point opposite the pivotal connection, said arm co-operating with the scale, and a pin projecting from the upper portion of the clamp, to be brought into line with the pins first named, and means for adjusting the pivoted arm.

In testimony whereof I affix my signature.

BURT W. DECATUR.